United States Patent
Helava

[11] 3,803,720
[45] Apr. 16, 1974

[54] METHOD AND APPARATUS FOR MAKING HOLOGRAMMETRIC MEASUREMENTS

[75] Inventor: Uuno Helava, Southfield, Mich.

[73] Assignee: The Bendix Corporation, Southfield, Mich.

[22] Filed: Sept. 27, 1971

[21] Appl. No.: 184,152

[52] U.S. Cl............ 33/228, 33/227, 33/277, 33/280, 33/DIG. 21, 250/59, 356/18
[51] Int. Cl............ G01c 11/00, G01b 11/14
[58] Field of Search............ 33/277, 278, 279, 280, 33/281, 228, 1 CC, 276, 284, 285, 174 J; 356/9, 18; 250/59, 60, 61, 62, 63, 64

[56] References Cited
UNITED STATES PATENTS

| | | | |
|---|---|---|---|
| 2,095,059 | 10/1937 | Donnelly | 33/174 J |
| 3,445,855 | 5/1969 | Grant | 33/174 P |
| 534,993 | 3/1895 | Buford | 33/285 |
| 1,527,086 | 2/1925 | Schubert | 33/284 |
| 3,545,086 | 12/1970 | Brill et al. | 33/228 |

*Primary Examiner*—Robert B. Hull
*Assistant Examiner*—Richard R. Stearns
*Attorney, Agent, or Firm*—Lester L. Hallacher

[57] ABSTRACT

A system employing the principles of holography in making accurate measurements of objects is described. The system includes a holographic reconstruction means, an image viewing means, an object point selection means, and coordinate position determining means. The hologram is stationarily positioned, and specific selected points on the image are viewed with the object point selection means aimed at the selected points. Spatial position measurements are made with respect to each selected point and the measurements used to calculate the exact relative positions of the points. The measurements can be converted to electrical signals and used to drive graphic plotting equipment or other electrically controlled equipment.

12 Claims, 7 Drawing Figures

INVENTOR
UUNO V. HELAVA

INVENTOR
UUNO V. HELAVA

BY
ATTORNEY

INVENTOR
UUNO V. HELAVA

ATTORNEY

INVENTOR
UUNO V. HELAVA

ATTORNEY

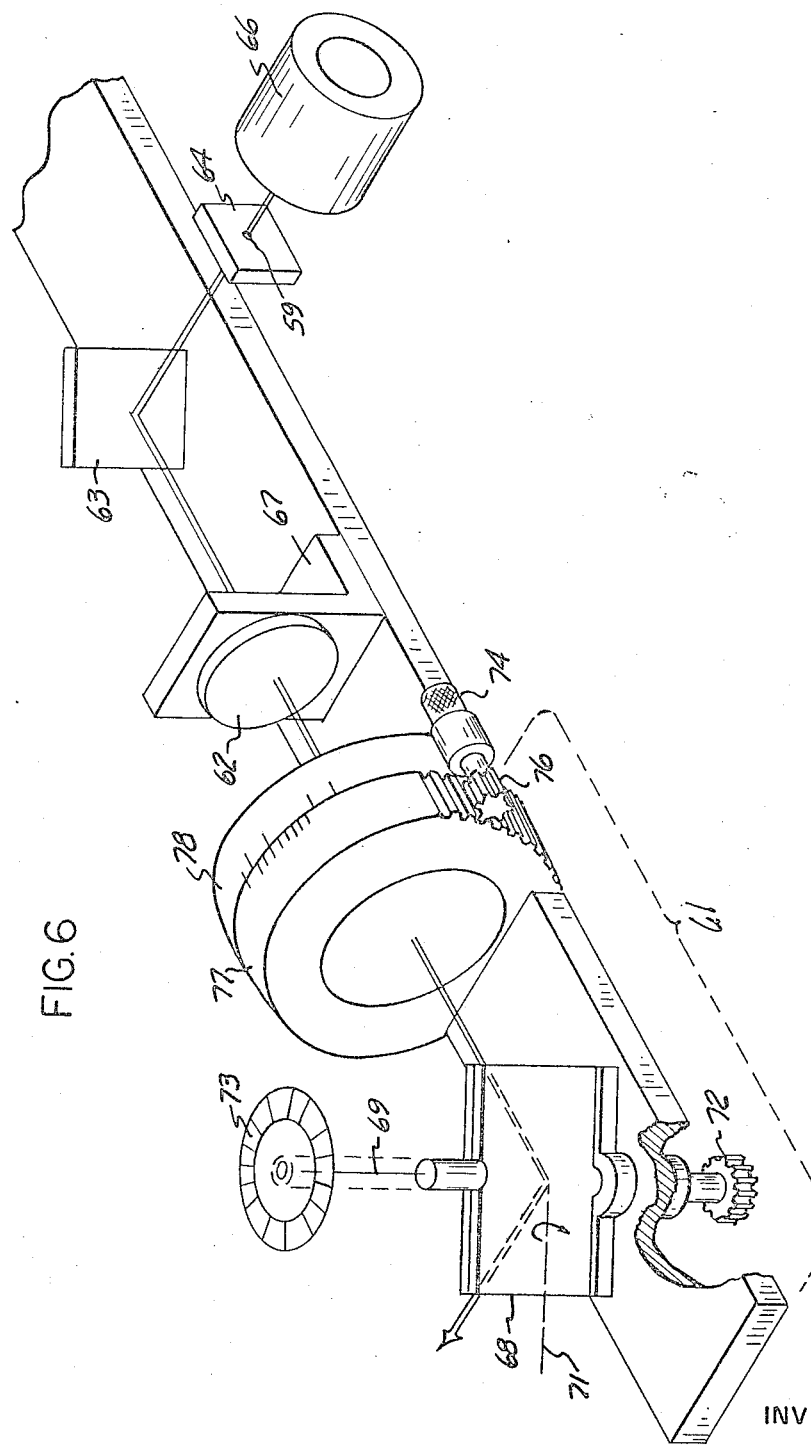

METHOD AND APPARATUS FOR MAKING HOLOGRAMMETRIC MEASUREMENTS

BACKGROUND OF THE INVENTION

The art and science of photogrammetry based on the use of central projective images is well known. Photogrammetry is widely used for map making purposes, and it has long been recognized that the techniques are applicable to industrial metrology and similar purposes. Even though these applications of photogrammetry have been recognized, they have not been generally adopted or reduced to a commercial reality but have instead remained as laboratory curiosities. One important reason for this is an inherent physical limitation of short-range photography. A photograph has a limited depth of field, that is, only one plane of the photographed object is imaged with optimal sharpness. The sharpness of details outside this plane is dependent upon the distance of the detail from the plane of optimum sharpness. The depth of field can be increased in a practical sense by decreasing the lens diameter to a smaller $f$ stop. However, this results in a decrease of the optimum sharpness because of the diffraction phenomena. As a consequence, the measuring accuracy decreases. lensless photography, or holography, provides a solution to this deficiency of short-range photogrammetry. A hologram, as is known by those skilled in the art, has a depth of field as large as the coherence range of the laser used in making the hologram. However, a hologram is fundamentally different from an ordinary photograph, the principles of photogrammetry have not been applied to holography to extend its applications to the measurement of objects. The invention discloses how the principles of photogrammetry can be extended to holography to provide an accurate and convenient means for the measurement of dimensions of objects.

A detailed description of the art of holography is not required, because the principles are known and fully described elsewhere. However, a brief explanation of some selected aspects of holography important to this invention serves as an aid in understanding the invention.

A hologram is a photographic record. However, although the recorded information is visible to the naked eye, it cannot be distinguished with the naked eye or with standard photographic viewing means because of the diffused nature of the recorded information. A hologram is an interference pattern, or a record of intensity patterns, produced by the interference of two or more coherent wavefronts. One wavefront is reflected from the object and the other is a reference beam. Because of the wavefronts originated from an object from which coherent light was reflected when the hologram was being made, an image of the object can be seen by "reconstructing" the hologram. Reconstruction of the hologram is accomplished by illuminating the hologram with a coherent wavefront of energy usually having the same frequency as one of the wavefronts involved in making the hologram. By looking through a suitably reconstructed hologram one can visually observe an original object much the same as if the object were still there. This is so because the reconstructed wavefront is an accurate replica of the wavefront produced by the coherent light reflected from the object originally. Thus, viewing through the hologram from any vantage point results in a view of an image that is a faithful three-dimensional replica of the originally recorded object. Furthermore, the image appears in the same original position as the object with respect to the hologram, thus as the vantage point is changed the view of image changes exactly as the view of the object would change as the vantage point of the object is changed.

When a photographic recording is cut or portioned and reproduced, each piece includes a portion of the recorded image. When a hologram is cut and portioned, each portion when illuminated with coherent energy will result in a complete image of the object. The resolution of each portion is less than that of the whole, but the entire image is seen for each portion.

SUMMARY OF THE INVENTION

The term "hologrammetry" is used throughout the disclosure, and a definition is thus appropriate. The term is derived from "hologram" in much the same way the term "photogrammetry" is derived from "photogram" which was used in the early days of photography in place of the term "photograph." Both terms include the suffix "-metry," meaning measurement. The meanings of the two terms are thus similar —photogrammetry meaning measurement utilizing photographs; hologrammetry meaning measuremnt utilizing holograms.

Because the reconstruction of a hologram results in a three-dimensional image of the recorded object, the principles of trigonometry and geodesy can be utilized to make measurements of objects by utilizing the principles of holography. In the inventive system this is accomplished by first illuminating the object to be measured with a beam of coherent energy and receiving the energy reflected from the object on a recording medium. Simultaneously with this illumination, the recording medium is illuminated with a reference beam of coherent energy which ordinarily would have the same frequency as the energy which illuminates the object. This results in the recording of an interference pattern which is representative of the visual characteristics of the illuminated object. Although this interference pattern can be viewed with the naked eye, no meaningful information can be obtained by thus viewing the hologram. However, upon the subsequent illumination of a hologram with coherent energy, a three-dimensional image of the object is obtained. The invention described several systems for utilizing a holographic image to record and measure the dimensions along the object. This is done by moving a visual object point locating mechanism so that it points at the desired point of the object. The orientation of the object locating mechanism with respect to a reference datum is then recorded and ultimately used to determine the spatial positioning of the object point. The subsequent measurement of many points along the object can thus be made so that the location of these points on the object with respect to the reference datum is indicated by the measurements. These measurements can then be used to calculate the dimensions along the object between the points. Alternatively, the oridinate changes of the point locating mechanism can be used to actuate an electrical system so that graphic plots of the object can be made automatically simply by moving the mechanism between the points along the surface of the object.

BRIEF DESCRIPTION OF THE DRAWINGS

FIG. 6 is a schematic showing of the details of the viewing mechanism of the embodiment shown in FIG. 5.

DETAILED DESCRIPTION

Figure 1:
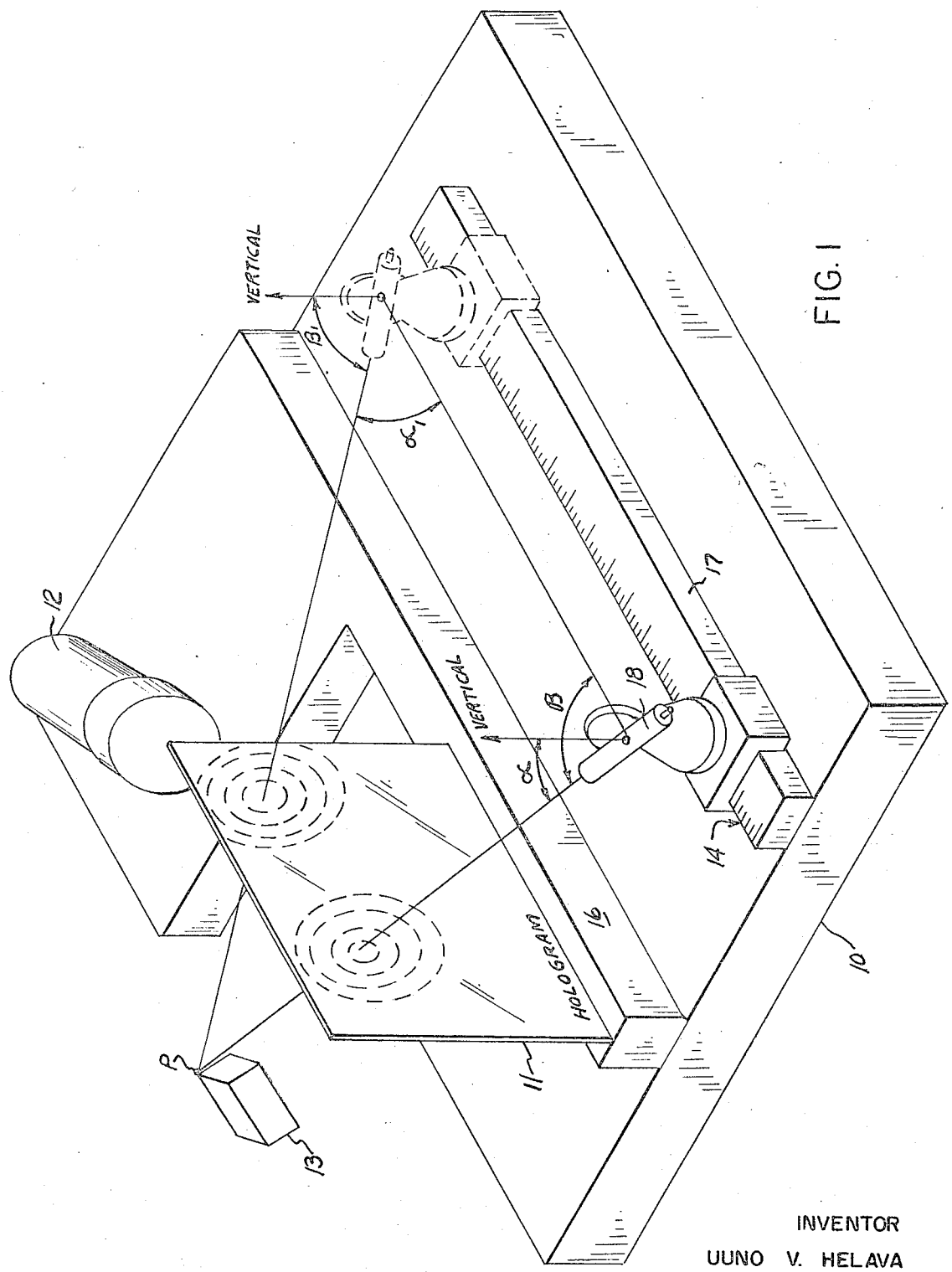
FIG. 1 shows a preferred embodiment of an apparatus for performing hologrammatic measurements utilizing the techniques of intersections of lines of sight.

FIG. 1 is a preferred embodiment of the invention and shows an apparatus for performing hologrammatic measurements utilizing the intersection of two lines of sight. A base 10 supports a Hologram 11 and a measuring Apparatus 14 in a fixed relationship. Hologram 11 need not be precisely located in any particular position. However, after it is positioned it cannot be moved during the hologrammatic procedure. A coherent light Source 12 illuminates Hologram 11 to produce a three-dimensional image 13 of the object from which the hologram was formed.

Hologram 11 is mounted on Base 10 by use of a mounting Mechanism 16 of any convenient type which is capable of supporting Hologram 11 in a vertical position with respect to Base 10. Mounting Mechanism 16 also supports Laser 12 which is used to illuminate the Hologram 11 and thus produce Image 13. Image 13 appears in the same position with respect to Hologram 11 that the object appeared when the hologram was formed. The exact positioning of Hologram 11 and Laser 12 on Base 10 is unimportant. However, Hologram 11 must be fixedly supported so that no movement occurs after the measuring procedure begins.

Positioning Measuring Apparatus 14 includes a dimensioned position-indicating Scale 17 which is used to very precisely indicate the positioning of an Angle Measuring Mechanism 18. Angle Measuring Mechanism 18 is slidably carried by Scale 17 and can be fixedly maintained at any selected position along Scale 17 by use of any of several known arrangements. Angle Measuring Apparatus 18 can be any optical instrument which is capable of measuring both horizontal and vertical angles, such as a theodolite. The primary requirement of Theodolite 18 is that it is capable of precisely measuring the vertical and horizontal deviations of the line of sight with respect to the selected positions along Scale 17.

In usage the measuring mechanism is positioned at a very precisely determined position and a point on Image 13, such as point P, is viewed while the vertical and horizontal angles, $\alpha$ and $\beta$ respectively, are noted. Theodolite 18 is then moved to a second position as indicated in dotted lines, and this position is accurately noted before the angles $\alpha_1$ and $\beta_1$ are measured while viewing point P, that is, the same point on Object 13. If high precision is desired, the same point P can be viewed from a plurality of locations along Scale 17, and the angles of view measured and recorded for each of the several locations. After the angles are determined with respect to the selected number of scale positions, the exact location of point P can be determined by using these measurements in manners known to surveyors and geodesists. Furthermore, it will be appreciated that, although only one point P is illustrated, the angular disposition of many points along the object can be measured for each location of Measuring Mechanism 18. In this manner the exact positioning of any desired number of points on Object 13 can be determined with great precision.

It should also be appreciated that, by using the methods of geodesy, a reverse determination is also possible using the invention mechanism. That is, if the spatial coordinates of at least three observed points on Object 13 are known, the coordinates of the vantage points can be calculated.

Figure 2:
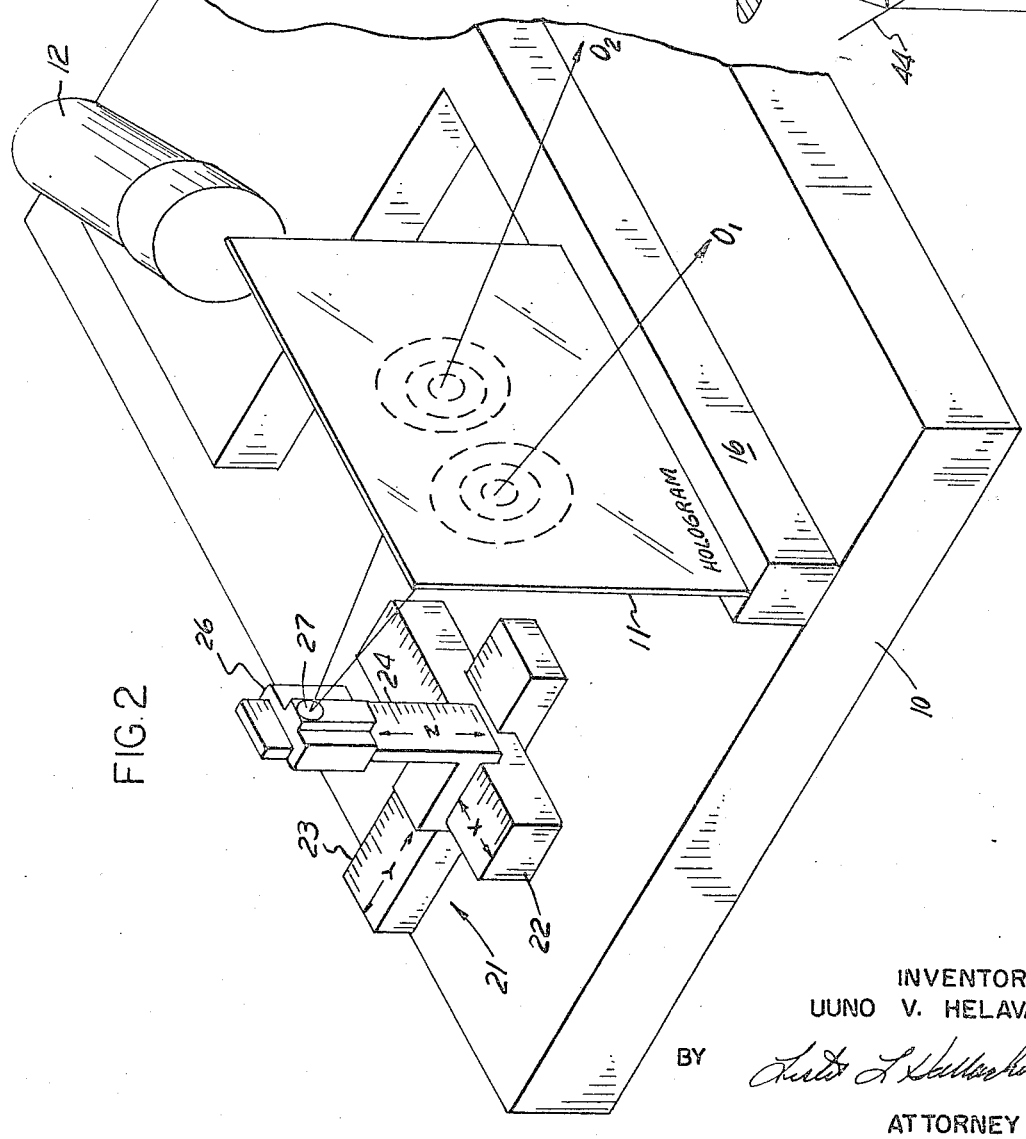
FIG. 2 is a preferred embodiment utilizing the unaided human viewing of the holographic image.

FIG. 2 shows a hologrammatic system which utilizes a point source of light and the direct viewing of a human operator. The system of FIG. 2 is similar to that of FIG. 1 in that it also includes Base 10, Mounting Mechanism 16 for sturdily supporting Hologram 11 in a vertical position, and Laser 12. Laser 12 is used to illuminate the hologram and thereby reconstruct the image of the object from which the hologram is formed (not shown in FIG. 2). In the embodiment of FIG. 2, the measurement of the coordinate locations of points on the image is made by use of the measuring Apparatus 21. This apparatus includes a coordinate measuring Scale 22 for making measurements along the X axis; a similar Scale 23 for making measurements along the Y axis; and another similar Scale 24 for making Z axis measurements. Mounted on Z coordinate Scale 24 is a measuring Mark Mechanism 26 which includes an illuminated Pinhole 27. Pinhole 27 can be illuminated by the use of a small lamp or a light pipe and is used to direct incoherent light to a selected point on the vertical object.

Measurement of the coordinate locations along the X, Y, and Z axes of points on the image are made by directly viewing the image through Hologram 11. This is indicated by the "Eyes," $O_1$ and $O_2$, which in FIG. 2 represent the eyes of the operator. An operator thus viewing Hologram 11 will see a three-dimensional image of the object from which Hologram 11 was formed. Spatial locations of points on the image are identified by moving Pinhole 27 along the X, Y, and Z axes Scales 22, 32, 26, until the light emanating from Pinhole 27 corresponds to (is coincident with) a selected point on the object the coordinate positions of which are to be determined. After this correspondence is effected, the X, Y, and Z locations of the point are determined by viewing the dimensions provided on Scales 22, 23 and 24. The position of the point with respect to the origin of the X, Y, Z axes system is thus determined. Subsequent measurements of other point positions also yield information related to the axes system origin. Hence, because the origin is fixed, the positions of the points with respect to one another are known.

It should be noted that the exact positioning of the eyes, $O_1$ and $O_2$, of the operator with respect to Hologram 11 and thus with respect to the image being measured does not affect the outcome of the measuring process. This is so because the position of the image with respect to Hologram 11 is determined solely by the position of the object when Hologram 11 is formed. Accordingly, the operator can conveniently move his head to various positions, so long as he views through Hologram 11 and the light emanating from Pinhole 27 can be accurately brought into coincidence with the point on the image the location of which is to be measured. It should also be noted that, if desired, the operator may use various magnifying means and other optical means to improve his view of the object. These include such items as a reading glass or a binocular loupe to assist in a more accurate location of the particular desired points along the image. Optical distortions of such magnifying devices do not affect the coordinate measurements because the distortions are the same for all points measured, and accordingly the relative positions of the points with respect to each other along the object are the same irrespective of the distortion of the optical viewing apparatus.

It is readily apparent that making the measurements while viewing the virtual object with the naked eyes or by the means of simple magnification devices does not permit full utilization of the potential accuracy of hologrammetry. One obvious reason for this is the limited acuity of the unaided eye. Another less obvious reason is the reduction of the steroscopic acuity which occurs with the increasing distance of the virtual image from the observer. This acuity can be improved by providing higher magnification in the viewer and by the use of artificial separation of vantage points to a distance larger than the human interpupillar distance. It is also possible to view the virtual object through the hologram with an optical instrument such as a telescope, and thereby somewhat improve these deficiencies. However, the optical instrument includes lenses and is therefore accurately focused on one plane at a time in much the same manner as a camera. For this reason, the optical frequently must frequency be refocused when a three-dimensional virtual object is being viewed. This obviously results in a great inconvenience and is a deficiency which exists in the photogrammetric measuring apparatus and has retarded the commercialization of photogrammetric systems. However, in the hologrammetric apparatus the inconvenience can be overcome in either of two ways. The first solution includes a fixed focusing technique which employs changing the distance between the hologram and the viewing instrument. The second solution is a variable focusing technique which utilizes a mechanized automatic focusing apparatus which works in much the same manner as automatic focus photographic enlarging mechanisms.

A fixed focus hologrammetric instrument can be built either by making the viewing system movable, or making the hologram movable, or by making both the viewing mechanism and the hologram movable.

Figure 3:
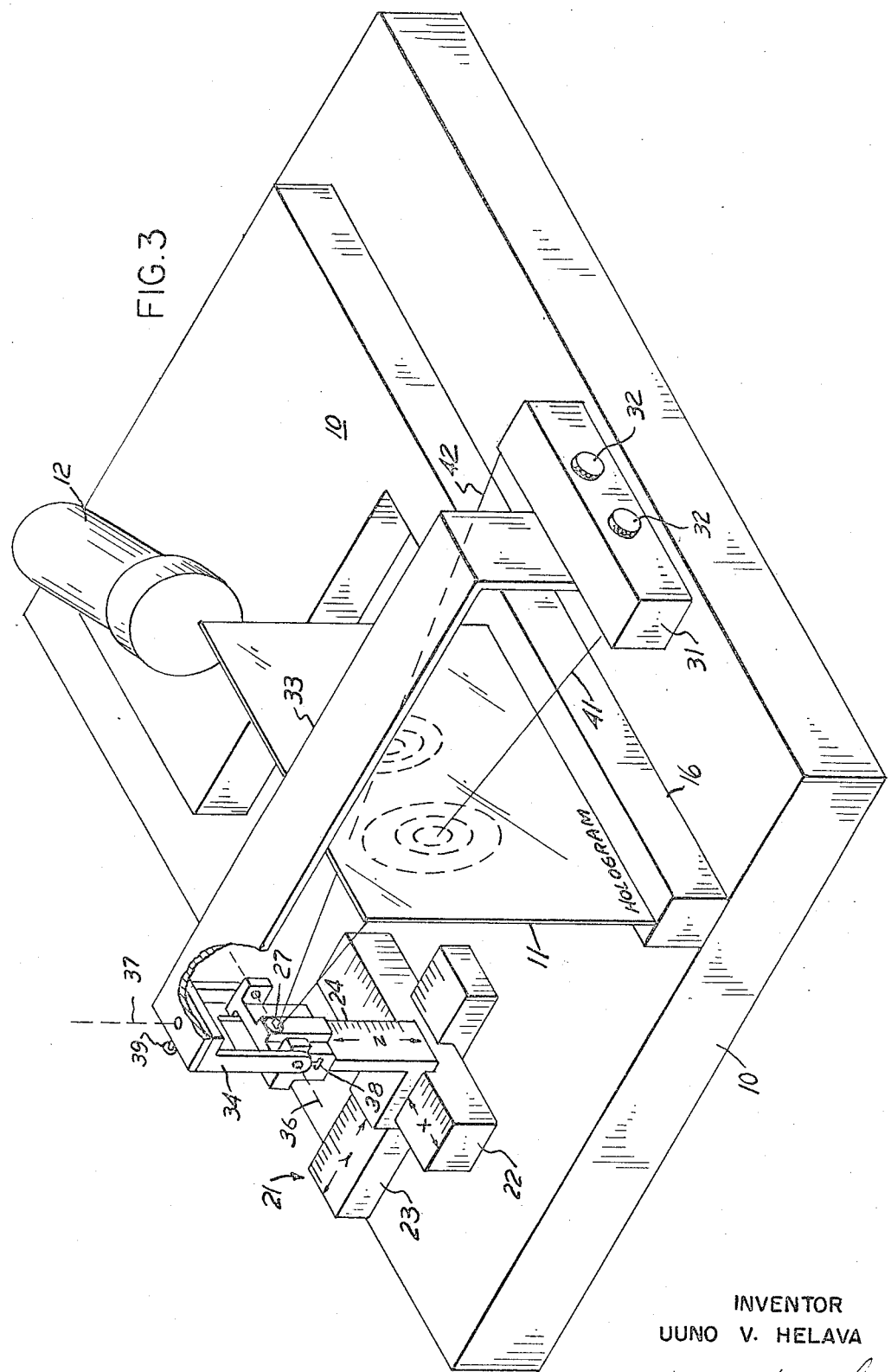
FIG. 3 is a preferred embodiment utilizing a fixed focusing technique.

FIG. 3 is an embodiment of a fixed focus hologrammetric instrument having a movable viewing system. The system is similar to the embodiments of FIGS. 1 and 2 in that it includes a Base 10, the Mounting Means 16 for sturdily supporting a Hologram 11 which is illuminated by a reconstruction coherent energy Source 12 to thereby produce a three-dimensional image of the object. FIG. 3 is also similar to FIG. 2 in that it contains the Mark Measuring Mechanism 21 and the associated axis position measuring Scales 22, 23 and 24, as well as the Pinhole Light Source 27 which is used to mark image points the coordinate locations of which are being measured.

An Optical Viewer 31 having two Eyepieces 32 is coupled to the point marking Mechanism 27 through a rigid coupling Member 33 and a pivotable Member 34. Member 34 is U-shaped so that it spans Pinhole 27 and is pivotably attached to the Marking Mechanism 21 through an Axis 36 which extends through Pinhole 27 and extends substantially parallel to the X axis. As a consequence of the pivotable connection, Viewer 31 can be raised and lowered with respect to the hologram so that Hologram 11 can be viewed from various elevations. Coupling Bar 33 is pivotably coupled to the U-shaped Member so that Viewer 31 can be pivoted about an Axis 37 which also extends through Pinhole 27 and which is substantially parallel to the Z axis. Axis 37 is perpendicular to Axis 36 and permits horizontal pivotal movement of Viewer 31. Because of the pivoting capability about Axes 36 and 37, Viewer 31 can be moved to any desired position without disturbing the position or orientation of Pinhole 27. Pivot Locks 38 and 39 are respectively provided to Axes 36 and 37 so that the Viewer 31 can be locked into any desired angular orientation. Because Viewer 31 can be moved without disturbing Pinhole 27, Permanent focusing can be employed. This is accomplished by fixing the distance between Viewer 31 and Pinhole 27 through selection of coupling Member 33. The length of Coupling Member 33 is selected so that Pinhole 27 is always in focus with the viewing Member 31. As a consequence, as the Pinhole 27 is moved along the X, Y and Z axes to cause the light emanating from Pinhole 27 to coincide with a particular point on the image being viewed, the focusing of Pinhole 27 with respect to Viewer 31 remains unchanged.

It will be appreciated that, if desired, a third pivotable axis can be provided to permit pivoting about an axis which is parallel to the Y axis as defined on the Measuring Mechanism 21. If provided, this axis will also extend through Pinhole 27.

The advantage of the system of FIG. 3 stems from the fixed focusing feature in that a magnifying optical Viewing System 31 can be used to enhance the detail with which the object can be viewed. However, the disadvantage of optical systems is overcome because of the fixed focus relationship between Viewer 31 and Pinhole 27. As a consequence of this relationship any point on the image being viewed is automatically in focus which it spatially coincides with the pinhole. Another advantage of the embodiment of FIG. 3 from the fact that the stereoscopic acuity can be increased beyond that of the human interpupillar distance. This can be understood by viewing FIG. 3 where the two lines of Sights 41 and 42 are shown emanating from Viewer 31 at points different from the centers of the viewing Lenses 32. This is a consequence of the construction of Viewer 31, which is known to those in the art. However, FIG. 4 shows in schematic form the operation and construction of Viewer 31.

Figure 4:
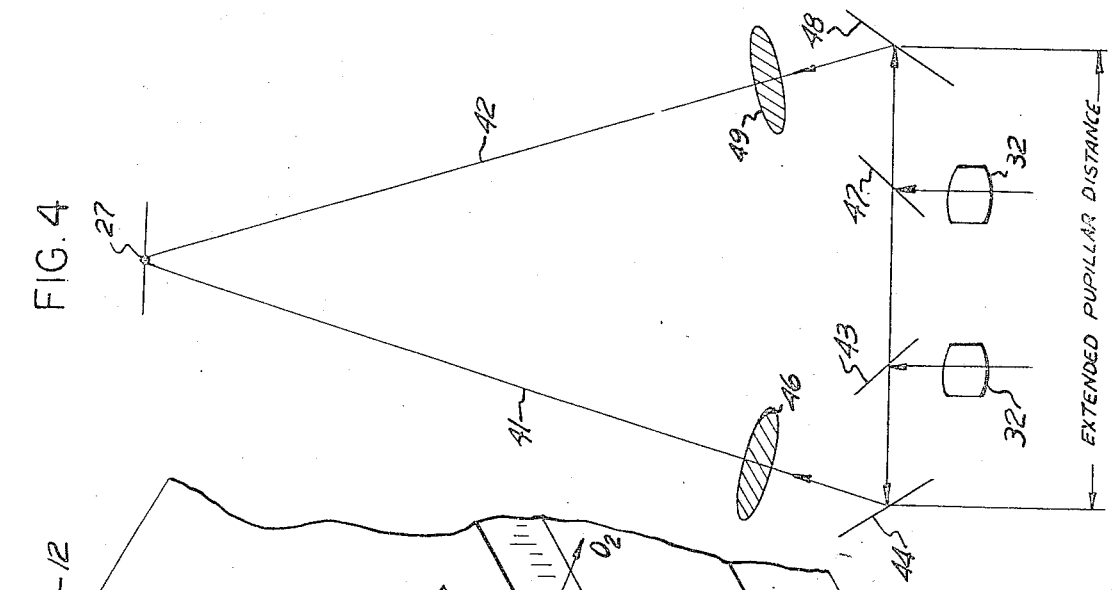
FIG. 4 is a schematic showing of the viewing mechanism utilized in the embodiment of FIG. 3.

In FIG. 4 the two Eyepieces 32 are arranged such that they are spaced by a distance which is equal to the average human interpupillar distance. The center of left Eyepiece 32 is axially spaced from the center of a Reflective Mirror 43 which is angularly disposed so that light rays passing through Eyepiece 32 are reflected at a right angle with respect to the incident direction. The light is then directed to a second Mirror 44 which is angularly disposed such that the light passes through a focusing lens 46 and is directed to Pinhole 27. This line of sight corresponds to Line of Sight 41 illustrated in FIG. 3.

The right eyepiece is similar to the left eyepiece in that a Mirror 47 reflects radiation at a right angle to a subsequent Mirror 48. The Mirror 48 is angularly disposed so that the impinging light passes through a Lens 49 and is focused at Pinhole 27. This corresponds to Line of Sight 42 shown in FIG. 3.

Because of this arrangement the stereoscopic acuity of the system is increased because of the additional spacing between the two lines of sight. Furthermore, because of the fixed separation between Pinhole 27 and Viewer 31, the viewer is always focused with respect to Pinhole 27.

The operation of the embodiment of FIG. 3 should now be understood to be relatively simple. Hologram 11 is mounted on Base 10 by means of a Mounting Mechanism 16 and subsequently illuminated with the output of Laser 12 to reconstruct the three-dimensional image recorded by the hologram. The operator then views the holographic image by means of the Viewing Mechanism 31, and will then see a merged view of the virtual object and the illuminated Pinhole 27. The operator then manipulates the coordinate measuring means until the measuring mark coincides with the point of interest on the virtual image. While moving the measuring mark around, the viewing Mechanism 31 will follow, necessitating the operating the operator to move his head accordingly. However, the Measuring Mark 27 is always in focus and accordingly when it coincides with a point on the virtual object the virtual object is also in focus. After directing Pinhole 27 to a particular point on an object, the operator can move the viewing mechanism to another position while maintaining the location of Pinhole 27 and thereby view the correspondance of Pinhole 27 with the point on the object from another point of view. This capability thereby increases the measuring acuity of the operator. After the operator is satisfied that Pinhole 27 is in correspondence with the desired point on the virtual image he can record the settings present on measuring Scales 22, 23, and 24.

After recording the locations of one point on the object, Pinhole 27 can be readjusted to correspond with another point on the object in like manner to thereby record the location of this point on the virtual object.

The embodiment of FIG. 3 can be modified by changing Viewer 31 and eliminating Light Spot 27 and Scales 22, 23 and 24. This is accomplished by constructing the viewer so that the point locating marks are included in the viewer. A viewer which can be used for this purpose is shown in FIG. 6 and is fully described hereinafter. Also, it will be appreciated that Viewer 31 shown in FIG. 4 can be modified to include a movable mark in each line of sight and position measurements of points on the image made in this manner.

In the embodiments of FIGS. 1, 2, and 3, the locations of the image points are indicated on readable scales. If desired, the movements of the scale indicators can be converted to electrical signals and used to actuate automatic graphic plotting equipment or other electrically controlled equipment, such as machine tools. Techniques and transducers for accomplishing these operations are available and known to those skilled in the art. It will also be appreciated that the position information can be converted into digital format and permanently stored. Subsequently, the stored information can be utilized to control automatic equipment, and also to produce a synthetic hologram by controlling the laser beam. All of these techniques are within the purview of those skilled in the art and thus need not be presented in detail herein.

In the embodiments thus far described, all angular measurements were made while viewing through a single hologram. This is not essential to the system in that different views can be taken through different holograms and the coordinates of the points nevertheless accurately located and recorded. As was described hereinabove, if the spatial coordinates of three or more points on the object are known it is possible to determine the position of the vantage points from which the observations were made. After the coordinates of the vantage points are determined, additional points can be measured and precisely defined relative to the now-known vantage points. Furthermore, after the positions of the vantage points are established with respect to their respective virtual objects it does not matter in what position or orientation the hologram is with respect to the vantage point. The angles are measured relative to the virtual image, not relative to the reality.

The use of two holograms can offer some advantages in hologrammetry, for example, a wider viewing base can be employed while retaining precise accuracy. This is important when distant objects, such as terrain features, are of interest. In such cases the angular separation between the lines of sight decreases with increasing distance resulting in less precise measurements. A system employing two holograms, is, therefore, described with respect to FIGS. 5 and 6.

Figures 5A, 5B:
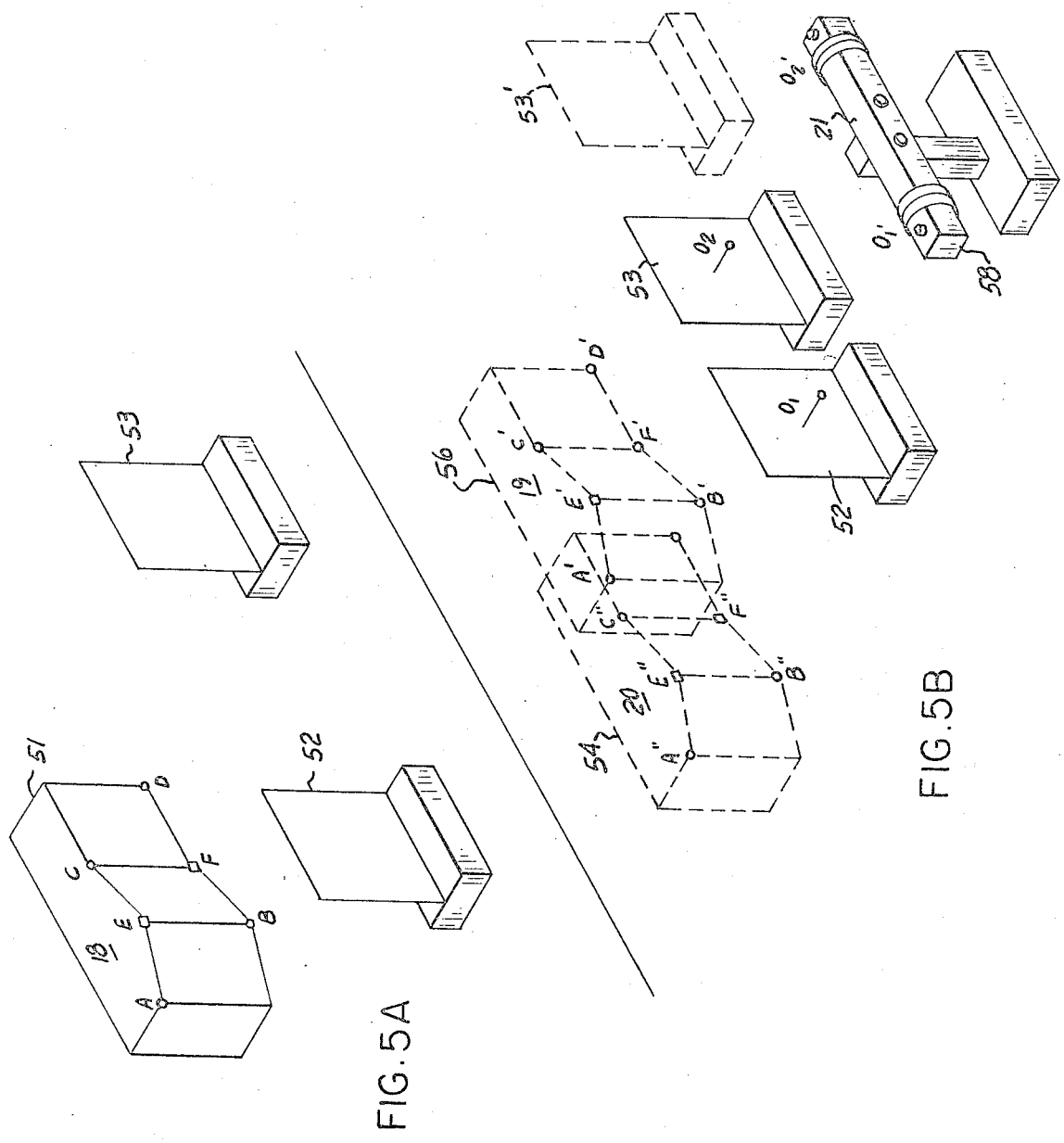
FIG. 5 shows how a plurality of holograms can be formed from the same object and accurate measurements utilizing both holograms.

In FIG. 5A an Object 51 is illuminated with a source of illuniating energy, which is not shown because the system used in any previous embodiments can be employed. The light from Object 51 is reflected to two holographic recording Plates 52 and 53, which are also simultaneously illuminated with a reference beam of coherent energy to thus form two holograms.

Reconstruction of Object 51 can be accomplished by using one of the apparatuses described with respect to FIGS. 1, 2, or 3, with the added modification that both holograms be illuminated with coherent energy source. Accordingly, FIG. 5B shows how a compact measuring apparatus can be constructed irrespective of the relatively large separation between Holograms 52 and 53 of FIG. 5A. The same principles apply when a single object is viewed from a large distance and accordingly a detailed description of this operation need not be presented herein. The compact measuring apparatus is made possible by relating the measurements on the holograms to the individual respective virtual images. This is so because, in FIG. 5B, the recorded Object 51 is represented by two virtual Images 54 and 56. Each of Images 54 and 56 is in a correct relative position with respect to Holograms 52 and 53, thereby relating the positions at which the holograms were located during the recording process. In FIG. 5B, the original positioning of Hologram 53 is represented by 53' and dash lines to thereby indicate the differences in the spacing between the holograms during the recording and the reconstruction processes. If points A, B, C, and D on Object 51 are known, several features can be calculated. Firstly, the knowledge of four points is greater than the minimum number of points which is required to determine the positions of the vantage points from which the holograms were recorded. And secondly, two different sets of known points can be used for determining the vantage point. Thus, angular measurements of directions from vantage point $O_1$ of FIG. 5B to the virtual object point $A'$, $B'$, and $C'$ may be used to determine the location $O'$, while similar measurements from point $O_2$ to virtual points $B''$, $C''$, and $D''$ may be used to determine the vantage point $O_2$. Subsequent measurements from $O_1$ to new points, for example, $E'$ and $F'$, and from vantage point $O_2$, for example $E''$ and $F''$, can then be used to derive positions E and F relative to A, B, C, and D on the Object 51. In like manner any number of points on Object 51 can be determined with respect to the known points A, B, C, and D.

In FIG. 5B, the Holograms 52 and 53 are viewed through the Viewing Mechanism 58 so that one eyepiece views through Hologram 52 and the other views through Hologram 53. For clarity of illustration, the points $O_1$ and $O'_1$ ordinarily would coincide as would $O_2$ and $O'_2$. However, they are shown separated in the illustration in order to clarity the illustration. Viewing Mechanism 58 can be similar to that shown in FIG. 4 and utilized in the system of FIG. 3, or, alternatively, a system which allows direct measurement such as that illustrated in FIG. 6 can be employed.

In FIG. 6 only the left half of the apparatus is shown because the right half would be identical thereto and would be a mirrored image thereof. The observing-measuring device is essentially a focusable folded telescope with an internal Reference Mark 59 and an adjustable beam focusing Mechanism 61. Optical measuring systems of this general type are known to those skilled in the art; however, briefly described, the system includes an Objective Lens 62, a beam-bending Mirror 63, a Graticule 64 which also contains the Reference Mark 59, and an Eyepiece 66. Objective Lens 62 forms an image of the object being viewed on the plane of Graticule 64 where the image is superimposed on the Measuring Mark 59. The composite superimposed image of the Reference Mark 59 and the object is viewed by means of the Eyepiece 66. Objects at different distances can be viewed by focusing the telescope, which is accomplished by moving objective Lens 62 on its movable, focusing support Slide 67.

Beam Deflection Means 61 is used to cause a particular point on the object being viewed to correspond with Reference Mark 59 on Graticule 64. Deflection Means 61 includes a Mirror 68 which is rotable about a vertical Axis 69 and a horizontal Axis 71. Axes 69 and 71 intersect at the center of Mirror 68. Rotation about vertical Axis 69 is effected by rotation of Knurled Knob 72. The amount of rotation can be read from the graduated Scale 73 which is shown in an elevated position for clarity of the illustration. Rotation about horizontal Axis 68 is effected by use of a Knurled Knob 74 through Pinion 76 which coacts with rotatable Ring 77. The angular degree of rotation about horizontal Axis 71 can be read by means of the graduated scales present on rotatable Ring 77 and stationary Ring 78.

In operation the user of the system views through Eyepiece 66 and causes Mark 59 to correspond with the desired point on the image by appropriately rotating Knurled Knobs 72 and 74, thus effecting rotation about Axes 69 and 71. When correspondence of the Mark 59 and the point on the object is achieved, the angular dispostion is noted by reading the scales on Elements 73 and 77. It will be noted that like measurements are made with respect to the other eyepiece, so that information relative to a single point is achieved from two vantage points of view.

Other known and equivalent mechanisms for the observing and measuring systems described with respect to FIG. 6 can be utilized in the system.

If desired, the rotation about horizontal Axis 71 can be the same for both the right and left scanning telescope. This arrangement is particularly useful when Axis 71 can be made parallel to any lines of the object along which points are to be measured.

It will also be appreciated by those skilled in the art that servo motors can be coupled to the Knurled Knobs 72 and 74 so that the rotation of the knurled knobs results in rotation of the servo motors. This servo motor rotation can then be utilized to produce electrical signals which are then used to automatically plot the object along which the points are calculated.

What is claimed is:

1. A system for determining the relative position of points on a holographic image comprising:
   a pinhole light source for marking a point in space;
   means for visually selecting particular points on said image including means for displacing said pinhole light source to bring said pinhole light source into coincidence with each of said selected points, one at a time; and
   means connected to said means for displacing for indicating the coordinate position of said pinhole light source with respect to at least two coordinate axes so that the coordinate positions of a plurality of said selected points are indicated and related to said axes and the relative positions of said points can be determined.

2. The system of claim 1 further including means for mounting a holographic interference pattern in a fixed position with respect to said coordinate axes, and a source of coherent light for illuminating said interference pattern to produce said image, said selected points and said pinhole light source being simultaneously viewed through said pattern as said pinhole is brought into correspondence with one of said selected points so that the displacements of said pinhole with respect to said axes are indicated by said indicating means.

3. The system of claim 3 wherein said indicating means includes three mutually perpendicualr linear scales defining said coordinate axes, said pinhole being movable with respect to the three coordinate axes so that movement of said pinhole is indicated by the scales associated with the axes along which movement occurred.

4. The system of claim 1 further including optical viewing means permanently focused with respect to said pinhole and rotatable about at least one axis extending through said pinhole and parallel to one of said coordinate axes.

5. The system of claim 4 further including means for mounting a holographic interference pattern in a fixed position with respect to said coordinate axes, and a source of coherent light for illuminating said pattern to produce said image, said interference pattern being interposed between said pinhole light source and said optical viewing means so that said image and said pinhole light source are simultaneously viewed through said optical viewing means as said pinhole is brought into correspondence with one of said selected points.

6. The system of claim 5 wherein said optical viewing means is permanently spaced a selected distance from said pinhole so that any point on said image in correspondence with said pinhole is focused in said optical viewing means.

7. The system of claim 6 wherein said indicating means includes three mutually perpendicular linear scales defining said coordinate axes, said pinhole being movable with respect to the three coordinate axes so that movement of said pinhole is indicated by the scales associated with the axes along which movement occurred.

8. The system of claim 7 wherein said optical viewing means is rotatably coupled to said pinhole light source so that said pinhole and one of said selected points can be viewed from a wide range of vantage points while leaving the correspondence of said pinhole and said selected point and the focusing of said pinhole undisturbed.

9. A system for determining the relative position of selected points on a holographic image comprising:
   a stereoscopic viewer for viewing said holographic image including point marks in each line of sight of said stereoscopic viewer for forming a stereoscopic image in space;
   means for displacing said stereoscopic image to bring said stereoscopic image into coincidence with each of said selected points, one at a time; and
   means connected to said means for displacing for indicating the coordinate positions of the stereoscopic image formed by said point marks with respect to at least two coordinate axes so that the coordinate positions of a plurality of said selected points are indicated and related to said axes.

10. The system of claim 9 wherein said means for displacing comprises means for displacing said point marks with respect to said coordinate system.

11. A method of making hologrammetric measurements including the steps of:
   illuminating a holographic interference pattern with coherent electromagnetic radiation to produce a holographic image and establishing a coordinate system in a fixed position with respect to said pattern;
   positioning a pinhole light source in spatial correspondence with selected points on said image; and
   determining the spatial position of said selected points on said image by reading on scales connected to said pinhole light source the displacement of said pinhole light source with respect to said coordinate system when said pinhole light source is in spatial correspondence with each one of said selected points.

12. The method of claim 11 wherein said positioning step is accomplished using a viewing means having a fixed focus relationship with respect to said pinhole light source.

* * * * *